(12) United States Patent
Heinzemann et al.

(10) Patent No.: US 12,354,331 B2
(45) Date of Patent: *Jul. 8, 2025

(54) COMPUTER-IMPLEMENTED METHOD FOR ANALYZING RELEVANCE OF VISUAL PARAMETERS FOR TRAINING A COMPUTER VISION MODEL

(71) Applicant: Robert Bosch GmbH, Stuttgart (DE)

(72) Inventors: Christian Heinzemann, Ludwigsburg (DE); Christoph Gladisch, Renningen (DE); Matthias Woehrle, Bietigheim-Bissingen (DE); Ulrich Seger, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 450 days.

This patent is subject to a terminal disclaimer.

(21) Appl. No.: 17/647,313

(22) Filed: Jan. 6, 2022

(65) Prior Publication Data
US 2022/0237897 A1    Jul. 28, 2022

(30) Foreign Application Priority Data
Jan. 22, 2021   (DE) ............ 10 2021 200 568.3

(51) Int. Cl.
| | | |
|---|---|---|
| *G06V 10/774* | (2022.01) | |
| *G06F 3/0484* | (2022.01) | |
| *G06F 18/214* | (2023.01) | |
| *G06N 20/00* | (2019.01) | |
| *G06T 7/35* | (2017.01) | |
| *G06V 10/82* | (2022.01) | |
| *G06V 20/56* | (2022.01) | |

(52) U.S. Cl.
CPC .......... *G06V 10/774* (2022.01); *G06F 3/0484* (2013.01); *G06F 18/214* (2023.01); *G06N 20/00* (2019.01); *G06T 7/35* (2017.01); *G06V 10/82* (2022.01); *G06V 20/56* (2022.01)

(58) Field of Classification Search
CPC ...... G06V 10/774; G06V 10/82; G06V 20/56; G06F 3/0484; G06F 18/214; G06T 7/35; G06N 20/00
See application file for complete search history.

(56) References Cited

U.S. PATENT DOCUMENTS

| | | | | |
|---|---|---|---|---|
| 2013/0151495 | A1* | 6/2013 | Bennett | G06F 16/951 |
| | | | | 707/706 |
| 2019/0042900 | A1* | 2/2019 | Smith | G06V 10/96 |
| 2019/0354838 | A1* | 11/2019 | Zhang | G07C 5/085 |

(Continued)

OTHER PUBLICATIONS

Dosovitskiy et al., "CARLA: An Open Urban Driving Simulator," 1st Conference on Robot Learning, 2017, p. 1-16. (Year: 2017).*

(Continued)

*Primary Examiner* — Amandeep Saini
*Assistant Examiner* — Daniella M. DiGuglielmo
(74) *Attorney, Agent, or Firm* — NORTON ROSE FULBRIGHT US LLP

(57) ABSTRACT

A computer-implemented method for analysing the relevance of visual parameters for training a computer vision model. Upon adjusting the set of visual parameters to increase their relevance, a new set of visual data and corresponding groundtruth results that can be used in (re) training and/or testing the computer vision model.

18 Claims, 9 Drawing Sheets

(56) References Cited

U.S. PATENT DOCUMENTS

2020/0257941 A1\* 8/2020 Broyda ................. G06N 20/00
2020/0372625 A1\* 11/2020 Dal Mutto ........... G06V 30/153

OTHER PUBLICATIONS

Teodoro et al., "Algorithm sensitivity analysis and parameter tuning for tissue image segmentation pipelines," Bioinformatics, 33(7), 2017, p. 1064-1072. (Year: 2017).\*
Bargoti, S. and Underwood, J., "Utilising Metadata to Aid Image Classification in Orchards", IEEE International Conference on Intelligent Robots and Systems (IROS), Workshop on Alternative Sensing for Robot Perception (WASROP), 2015, pp. 1-3. (Year: 2015).\*
Dosovitskiy et al., "Carla: an Open Urban Driving Simulator," 1st Conference on Robot Learning (Corl 2017), Mountain View, US, 2017, pp. 1-16. <https://arxiv.org/pdf/1711.03938.pdf> Downloaded Jan. 6, 2022.
Bargoti and Underwood: "Utilising Metadata to Aid Image Classification in Orchards", IEEE International Conference on Intelligent Robots and Systems (IROS), Workshop on Alternative Sensing for Robot Perception (WASRoP), 2015, pp. 1-3.
Teodoro, et al.: "Algorithm sensitivity analysis and parameter tuning for tissue image segmentation pipelines", Bioinformatics, 33(7), (2017), pp. 1064-1072.

\* cited by examiner

The world model corresponds to ( 10 )
```
worldmodel = OrderedDict ( [     ( ' spawn_point ', [ 0, 3, 6, 9, 12, 15 ] ),
                                 ( ' cam_yaw ', [ -20, -10, 0, 10, 20 ] ),
                                 ( ' cam_pitch ', [ -10, -5, 0, 5, 10 ] ),
                                 ( ' cam_roll ', [ -10, -5, 0, 5, 10 ] ),
                                 ( ' cloudyness ', [ 0, 33, 66, 100 ] ),
                                 ( ' precipitation ', [ 0, 50, 100 ] ),
                                 ( ' precipitation_desposits ', [ 0, 50, 100 ] ),
                                 ( ' sun_altitude_angle ', [ 8 -10, 0, 33, 66, 100 ] )
                                 ( ' sun_azimuth_angle ', [ 0, 45, 90, 135, 180, 225, 270 ] )
                            ] )
```
.
.
.

The sampling algorithm corresponds to ( 11 )
```
#wmPairs = { k: [ ] for k in worldmodel.keys ( ) }
df = DataFrame ( columns = worldmodel.keys ( ) )

#Ensure that projection on each dimension still guarantees pair-wise coverage on the subspace
for dim in worldmodel.keys ( ) :
        for dim_val in worldmodel [ dim ] :
                wm_subspace = worldmodel.copy ( )
                wm_subspace [ dim ] = [ dim_val ]
                for row in AllPairs ( wm_subspace.values ( ) ) :
                        df.loc [ len ( df ) ] = row
df.drop_duplicates ( )
```
The output is df and corresponds to ( 12 ) desired_combis.csv

Fig. 7A

```
sensis = dict ( )
for i, dim in enumerate ( worldmodel.keys ( ) ) :
    dim_vals = worldmodel [ dim ]
    min_avg_acc = 1000000
    max_avg_acc = -min_avg_acc
    for val in dim_vals :
        imgIDs = desired_combis.loc [ desired_combis [ dim ] == val ]
        accs = [ ]
        for imgID in imgIDs.index :
            acc = get_acc_for_imgID ( img_perf, imgID )
            accs.append ( acc )
        avg_acc = sum ( accs ) / len ( accs )
        min_avg_acc = min ( min_avg_acc, avg_acc )  #34
        max_avg_acc = max ( max_avg_acc, avg_acc )  #35
    sensis [ dim ] = max_avg_acc - min_avg_acc  #36
```

Fig. 7B

COMPUTER-IMPLEMENTED METHOD FOR ANALYZING RELEVANCE OF VISUAL PARAMETERS FOR TRAINING A COMPUTER VISION MODEL

CROSS REFERENCE

The present application claims the benefit under 35 U.S.C. § 119 of German Patent Application No. DE 10 2021 200 568.3 filed on Jan. 22, 2021, which is expressly incorporated herein by reference in its entirety.

FIELD

The present invention relates to a computer-implemented method for analysing the relevance of visual parameters for training a computer vision model, an associated apparatus, computer program, computer readable medium, and a distributed data communications system.

BACKGROUND INFORMATION

Computer vision concerns how computers can automatically gain high-level understanding from digital images or videos. Computer vision systems are finding increasing application to the automotive or robotic vehicle field. Computer vision can process inputs from interactions between at least one detector, and the environment of that detector. The environment may be perceived by the at least one detector as a scene or a succession of scenes.

In particular, interactions may result from at least one electromagnetic source which may or may not be part of the environment. Detectors capable of capturing such electromagnetic interactions can, for example, be a camera, a multi-camera system, a RADAR or LIDAR system.

In automotive computer vision systems, computer vision often has to deal with open context, despite also being required to be safety-critical. Accordingly, computer vision systems can be further improved.

SUMMARY

According to a first aspect of the present invention, there is provided a computer-implemented method for analysing the relevance of visual parameters for training a computer vision model. In accordance with an example embodiment of the present invention, the method comprises the steps of:
  obtaining a computer vision model in an initial training state configured to perform a computer vision function of characterizing elements of observed scenes;
  obtaining a visual data set and selecting from it a first subset of items of visual data, and providing a first subset of groundtruth data that corresponds to the first subset of visual data;
  obtaining a first visual parameter set, with at least one visual parameter therein defining at least one visual state of at least one item in the first subset of visual data, wherein the at least one visual state is capable of affecting a classification or regression result of the computer vision model;
  applying the first subset of items of visual data to the computer vision model to obtain a plurality of predictions of elements of observed scenes in the first subset of items of visual data, wherein the predictions comprise at least one classification result and/or at least one regression result of at least one item in the first subset of visual data;
  computing a corresponding plurality of performance scores of the first visual parameter set characterizing the accuracy of the first computer vision model when providing the predictions of at least one classification result and/or at least one regression result, using the first subset of groundtruth data;
  performing a sensitivity analysis of the plurality of performance scores over the domain of the first visual parameter set; and
  generating a second subset of items of visual data and a second subset of groundtruth data that corresponds to the second subset of visual data according to the sensitivity analysis of the plurality of performance scores over the domain of the first visual parameter set.

In an example embodiment of the present invention, the computer-implemented method is provided for analysing the relevance of visual parameters to the performance of a computer vision model.

The method according to the first aspect is advantageously used to generate an improved training data set and/or an improved validation data set for training and/or testing a computer vision model. The improvement enables training/validation data sets to comprise visual parameters of the visual parameter set having more relevance to the performance of the computer vision model, thus having less bias.

For example, relevant visual parameters with higher relevance have, for example, higher variance on the performance of the computer vision model and result from a global sensitivity analysis. The term "higher relevance" does not, therefore, relate to any subjective or cognitive impression that a given scene in an item of visual data may give to a human observer. Higher relevance is a technical consequence of the interaction of visual image data with a computer vision model that may be untrained, partially trained, or fully trained (or trained to convergence). The notion of the relevance can be expressed with many technical figures of merit, although this application focusses on an example of the use of variance.

Training a further computer vision model on the improved training data set (cf. second aspect) yields a computer vision model capable of better generalizing to unseen (i.e. out-of-sample) items of visual data, thus increasing the accuracy of predictions made by the computer vision model. Testing on the improved validation data set reduces time and costs for testing.

According to a second aspect of the present invention, there is provided a computer-implemented method for training a computer vision model. In accordance with an example embodiment of the present invention, the method comprises:
  obtaining the second subset of items of visual data and the second subset of groundtruth data according to the computer-implemented method of the first aspect, or its embodiments, as a training data set;
  iteratively training a further computer vision model using the training data set; and
  outputting the further computer vision model.

The method according to the second aspect is advantageously used to retrain a computer vision model on the improved training data set generated according to the method of the first aspect, or its embodiments. Such retraining can be seen as meta-learning or active learning because from a holistic point of view (i.e. as far as an outer loop comprising training, validation and retraining is concerned) the training data set is changed taking intermediate performance of the computer vision model into account.

According to a third aspect of the present invention, there is provided an apparatus for performing computer vision.

In accordance with an example embodiment of the present invention, the apparatus comprises an input interface, a processor, a memory and an output interface.

The input interface is configured to receive a further visual data set and a further computer vision model trained according to the method of the second aspect, and store them in the memory.

The processor is configured to read the visual data set and the further computer vision model from the memory, and to apply the visual data set to the further computer vision model, to thus generate at least one image classification and/or regression result.

The output interface is configured to output the at least one image classification or regression result.

A fourth aspect of the present invention relates to a computer program comprising machine-readable instructions which, when executed by a processor, is capable of carrying out either (i) the computer-implemented method for providing the second subset of items of visual data and the second subset of groundtruth data according to the method of the first aspect, or its embodiments, as a training data set, and/or (ii) the computer-implemented method for training a further computer vision model according to the method of the second aspect.

A fifth aspect of the present invention relates to a computer readable medium comprising one or both of the computer programs.

A sixth aspect of the present invention relates to a distributed data communications system comprising a data processing agent, a communications network and a terminal device, wherein the terminal device is optionally comprised within an automobile or robot.

The data processing agent is configured to transmit the further computer vision model trained according to the method of the second aspect to the terminal device via the communications network.

Dependent embodiments of the aforementioned aspects are explained in the following description, to which the reader should now refer.

A visual data set is a set of items representing either an image, such as JPEG or GIF images or MPEG videos, wherein the items are captured by a capturing device, for example, a camera, and/or selected from a database comprising captured visual data, and/or generated synthetically by a synthetic image generator.

An item of groundtruth data corresponding to one item of visual data is a classification and/or regression result that the computer vision model is intended to output. In other words, the groundtruth data represents a correct answer of the computer vision model when input with an item of visual data showing a predictable scene or element of a scene. The term image may relate to a subset of an image, such as a segmented road sign or obstacle.

Optionally, a subset of items of visual data to a computer vision model to obtain a plurality of predictions of observed scenes may, therefore, comprise: inputting a plurality of single frames of image data, and calculating performance scores by comparing a classification or regression value of each of the single frames with a corresponding single element of groundtruth. Optionally, a plurality of portions (identified, for example, by segmentation) of single frames of image data may be input into a computer vision model, and performance scores calculated by comparing a classification or regression value of each of the single frames with a single element of groundtruth corresponding to each single frame. Optionally, an item of visual data may be a video sequence comprising a plurality of single frames. The computer vision model may optionally receive such a video sequence and return a single prediction, for the entire video sequence. For example, a video sequence having 100 frames showing a front view of a vehicle approaching a set of traffic lights might be classified as "approaching traffic lights". Alternatively, or in addition, the computer vision model may optionally receive such video sequence and return a prediction per frame of video, or for a subsampled plurality of frames of the video, enabling the temporal tracking of when a prediction state changed. Accordingly, a skilled person will appreciate that a variety of formats of visual data may be applied to the computer vision model, and a variety of prediction formats may be output.

A computer vision model is a function parametrized by model parameters that, upon training, can be learned based on the training data set using machine learning techniques. The computer vision model is configured to at least map an item of visual data or a portion, or subset thereof to an item of predicted groundtruth data. One or more visual parameters define a visual state in that they contain information about the contents of an observed scene and/or represent boundary conditions for capturing and/or generating the observed scene.

Relevance of visual parameters results from analysing the sensitivity of performance scores with respect to the visual parameters of the (first) visual parameter set. A quantitative measure for relevance can be variances of such performance scores.

The present invention provides means and, optionally, a visualization thereof to enable an expert to make an informed decision (for example, irrespective of the human perception system) as to how a first visual parameter set can be changed, thus yielding a second (i.e., the adjusted first) visual parameter set comprising visual parameters with higher relevance. For the second visual parameter set new/additional items of visual data and corresponding items of groundtruth data can be generated, forming new training and/or validation data sets that prove useful in learning and/or testing the computer vision model. At the same time the provided means may prompt an expert to consider additional changes, for example, in the design of the computer vision model. In addition, a computer vision model is trained on the new training and/or validation data sets to provide a more accurate computer vision model.

BRIEF DESCRIPTION OF THE DRAWINGS

FIG. 7A schematically illustrates an example pseudocode listing for defining a world model of visual parameters and for a sampling routine, in accordance with an example embodiment of the present invention.

FIG. 7B schematically illustrates an example pseudocode listing for evaluating a sensitivity of a visual parameter, in accordance with an example embodiment of the present invention.

DETAILED DESCRIPTION OF EXAMPLE EMBODIMENTS

Figure 1:
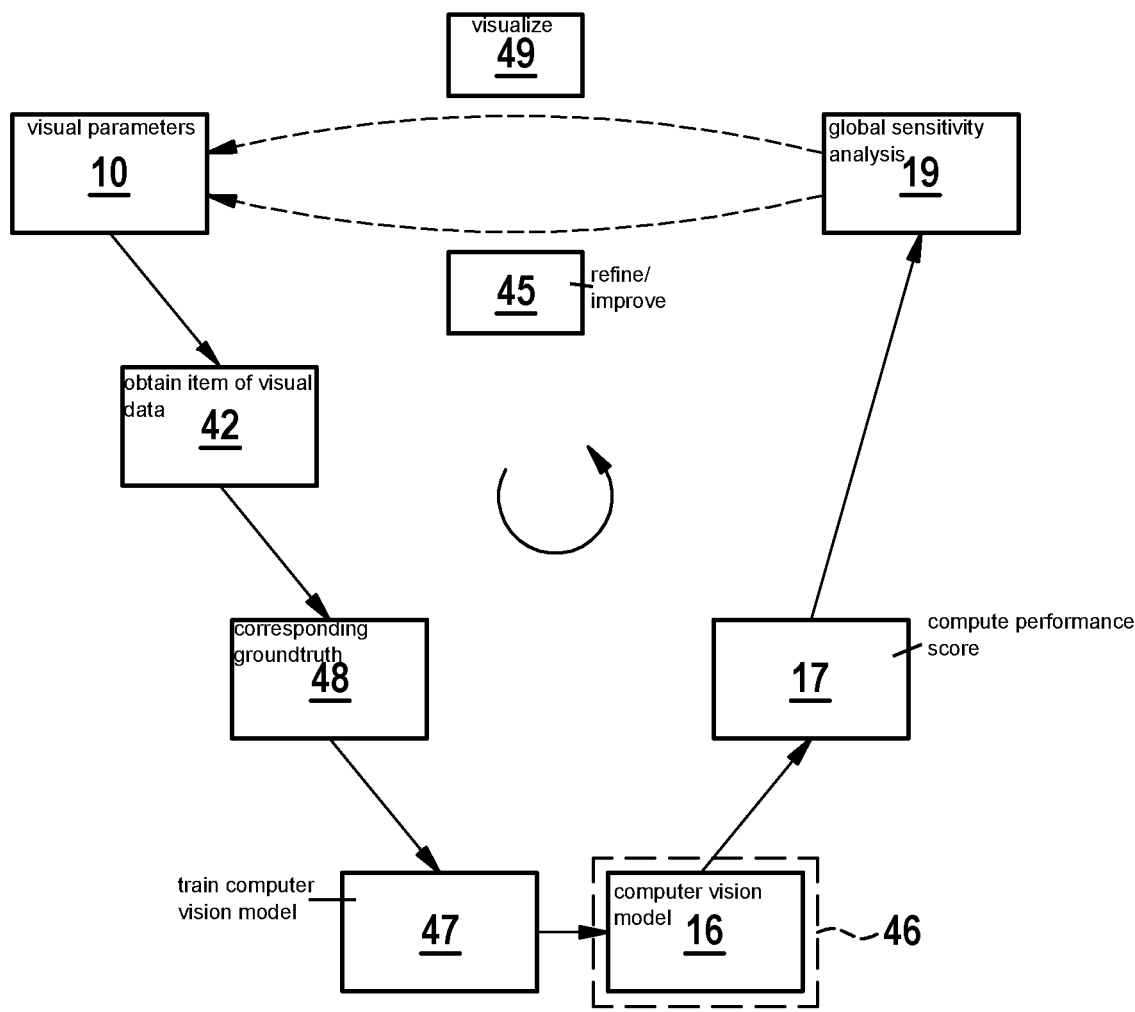
FIG. 1 schematically illustrates a development and validation process for analysing the relevance of visual parameters for training a computer vision model, in accordance with an example embodiment of the present invention.

Computer vision concerns how computers can automatically gain high-level understanding from digital images or videos. For example, computer vision may be applied in the automotive engineering field to detect road signs, and the instructions displayed on them, or obstacles around a vehicle, although many other uses exist.

To achieve this, one, or more of an object detection, semantic segmentation, 3D depth information, or navigation instructions for an autonomous or semi-autonomous system may be computed. Another common term used for computer vision is computer perception. In fact, computer vision can process inputs from any interaction between at least one detector 440a, 440b and its environment. The environment may be perceived by the at least one detector as a scene or a succession of scenes. In particular, interaction may result from at least one electromagnetic source (for example, the sun) which may or may not be part of the environment. Detectors capable of capturing such electromagnetic interactions can, for example be a camera, a multi-camera system, a RADAR or LIDAR system, or infra-red. An example of a non-electromagnetic interaction could be sound waves to be captured by at least one microphone to generate a sound map comprising sound levels for a plurality of solid angles, or ultrasound sensors.

Computer vision is an important sensing modality in automated or semi-automated driving. In the following specification, the term "autonomous driving" refers to fully autonomous driving, and also to semi-automated driving where a vehicle driver retains ultimate control and responsibility for the vehicle. Applications of computer vision in the context of autonomous driving and robotics are detection, tracking, and prediction of, for example: drivable and non-drivable surfaces and road lanes, moving objects such as vehicles and pedestrians, road signs and traffic lights and potentially road hazards.

Computer vision has to deal with open context. It is not possible to experimentally model all possible visual scenes. Machine learning—a technique which automatically creates generalizations from input data—may be applied to computer vision. The generalizations required may be complex, requiring the consideration of contextual relationships within an image.

For example, a detected road sign indicating a speed limit is relevant in a context where it is directly above a road lane that a vehicle is travelling in, but it might have less immediate contextual relevance to the control of that vehicle if it is not above the road lane that the vehicle is travelling in. The context may be changed based on whether the road-sign is above a single-lane road, or a multi-lane motorway. Driving along a single-lane road versus a multi-lane motorway is a difference in context. A detected road sign indicating a speed limit above a single-lane road mainly addresses the speed limit of the ego-vehicle. A detected road sign indicating a speed limit above a multi-lane motorway, on the other hand, can give additional context about the expected speeds of overtaking, or merging cars in other lanes relative to the ego-vehicle.

Deep learning-based approaches to computer vision have achieved improved performance results on a wide range of benchmarks in various domains. In fact, some deep learning network architecture implement concepts such as attention, confidence, and reasoning on images. As industrial application of complex deep neural networks (DNNs) increases, there is an increased need for verification and validation (V&V) of computer vision models, especially in partly or fully automated systems where the responsibility for interaction between machine and environment is unsupervised. Computer vision can contribute to fulfilling the norm "Safety of the intended functionality" (SOTIF) as required by automated driving for level 4 or 5.

Testing a computer vision model or qualitatively evaluating its performance is challenging because the input space of a typical computer vision model is large. Theoretically, the input space consists of all possible images defined by the combination of possible pixel values representing, for example, colour or shades of grey given the input resolution. However, creating images by random variation of pixel values will not produce representative images of the real world with a reasonable probability. Therefore, a visual dataset may comprise authentic (also referred to as real) (for example, captured experimentally by a physical camera) or synthetic (for example, generated using 3D rendering, image augmentation, or DNN-based image synthesis) images or image sequences (videos) which are created based on relevant scenes in the domain of interest, for example, driving on a road. In an example, a visual dataset may comprise a mixture of authentic and synthetic images or image sequences, and associated groundtruth. For example, a mainly authentic dataset may be augmented using synthetic images or image sequences to illustrated "corner cases" that are difficult to capture in experimental testing.

In industry, testing is often called verification. Even over a restricted input domain, the input space can be extremely large. Images (including videos) can, for example, be collected by randomly capturing the domain of interest, such as by driving along an arbitrary road and capturing images, or by capturing images systematically based on some attributes/dimensions/parameters in the domain of interest. While it is intuitive to refer to such parameters as visual parameters, it is not required that visual parameters relate to visibility with respect to the human perception system. It suffices that visual parameters relate to visibility with respect to one or more detectors.

One or more visual parameters define a visual state of a scene because it or they contain information about the contents of the observed scene and/or represent boundary conditions for capturing and/or generating the observed scene.

The visual parameters can be for example: camera properties (for example, spatial- and temporal-sampling, distortion, aberration, colour depth, saturation, noise etc.), LIDAR or RADAR properties (for example, absorption or reflectivity of surfaces, etc.), light conditions in the scene (light bounces, reflections, light sources, fog and light scattering, overall illumination, etc.), materials and textures, objects and their position, size, and rotation, geometry (of objects and environment), parameters defining the environment, environmental characteristics like seeing distance, precipitation-characteristics, radiation intensities (which are suspected to strongly interact with the detection process and may show strong correlations with performance), image characteristics/statistics (such as contrast, saturation, noise, etc.), domain-specific descriptions of the scene and situation (for example, cars and objects on a crossing), etc. Many more parameters are possible.

These parameters can be seen as an ontology, taxonomy, dimensions, or language entities. They can define a restricted view on the world, or an input model. A set of concrete images can be captured or rendered given an assignment/a selection of visual parameters, or images in an already existing dataset can be described using the visual parameters. The advantage of using an ontology or an input model is that for testing an expected test coverage target can be defined in order to define a test end-criterion, for example using t-wise coverage, and for statistical analysis a distribution with respect to these parameters can be defined. Images, videos, and other visual data along with co-annotated other sensor data (GPS-data, radiometric data, local meteorological characteristics) can be obtained in different ways. Real images or videos may be captured by an image capturing device such as a camera system. Real images may already exist in a database and a manual or automatic selection of a subset of images can be done given visual parameters and/or other sensor data. Visual parameters and/or other sensor data may also be used to define required experiments. Another approach can be to synthesize images given visual parameters and/or other sensor data. Images can be synthesized using image augmentation techniques, deep learning networks (for example, Generative Adversarial Networks (GANs), Variational Autoencoders (VAEs)), and 3D rendering techniques. A tool for 3D rendering in the context of driving simulation is for example the CARLA tool (Koltun, 2017, available at www.arXiv.org: 1711.03938).

Conventionally, in development and testing of computer vision models, the input images are defined, selected, or generated based on properties (visual parameters) that seem to be important according to expert opinion. However, the expert opinion relating to the correct choice of visual parameters may be incomplete, or mislead by assumptions caused by the experience of human perception. Human perception is based on the human perception system (human eye and visual cortex), which differs from the technical characteristics of detection and perception using a computer vision model.

In this case the computer vision model (also referred to as a computer vision model) may be developed or tested on image properties which are not relevant, and visual parameters which are important influence factors may be missed or underestimated. Furthermore, a technical system can detect additional characteristics as polarization, or extended spectral ranges that are not perceivable by the human perception system.

Training and/or testing a computer vision model requires a large amount (for example, >1e4, >1e5, >1e6, >1e7, >1e8, >1e9, >1e10) of items of visual data and corresponding groundtruth. A standard way to train and/or test a computer vision model 16 is to use a plurality of items of authentic (in other words, real) visual data, and corresponding groundtruth data as training data or validation data. It is desirable to train and/or test on relevant visual data.

The groundtruth (for example, labels) defines the expected output of the computer vision model for a corresponding input, and thus defines the correct test results. However, manually defining the groundtruth, such as for example labelling images or videos, is expensive and error-prone. Instead, items of visual data and corresponding groundtruth data are often synthesized. As an example, it is possible to increase the number of items of visual data and corresponding groundtruth by using techniques such as image augmentation, or 3D rendering. As another example, new images or videos with groundtruth can be generated by imposing or changing visual parameters such as, for example, weather conditions.

Ensuring the safety of computer vision models is a focus for their use in safety critical applications such as autonomous vehicles and robotics. Unlike traditional systems, new computer vision models are based on deep learning networks and are programmed implicitly, by training using example images and image sequences. The assumption is that the deep neural network correctly generalizes even for unseen inputs.

An observation is that the performance on new (unseen) inputs of a computer vision function is high, provided the input distribution is similar to that during training (or to the real world distribution which shall be represented in the training data). For a systematic and reliable generation or selection of a training data set and/or a validation data set, good image criteria (visual parameters/or detection characteristics) are necessary, but it is difficult for human experts to obtain and agree on such criteria. The present invention provides means to analyze, determine, and, optionally, visualize relevance of such visual parameters. In so doing, the (second) visual parameter set comprising relevant visual parameters can be defined. This set can also be referred to as the operational design domain (ODD).

FIG. 1 schematically illustrates a development and validation process for analysing the relevance of visual parameters for training a computer vision model. Such an illustrated model is applied in computer function development as "V-model".

The development and validation process aims at producing a (second) visual parameter set (ODD) comprising relevant visual parameters, which can be seen as an intermediate product that is used to retrain the computer vision model 16, the latter being a final product. A visual parameter set comprising an initial set or plurality of visual parameters 10 is provided.

For each visual parameter of the initial set of visual parameters an item of visual data with corresponding groundtruth 48 is obtained 42 (i.e. captured, generated, and/or selected).

A computer vision model 16 (optionally forming part of an autonomous or semi-autonomous system 46) can be trained 47 on the set of visual data and corresponding groundtruth 48. Alternatively, in case of a computer vision model 16 in an initial training state, training step 47 can be omitted. In any case, for each item of the set of visual data and corresponding groundtruth 48 a performance score can be computed 17 based on the item of groundtruth and the item of predicted groundtruth. In each case a global sensitivity analysis 19 on performance scores with respect to the visual parameters 10 can be performed. The global sensitivity analysis 19 characterizes the performance of the computer vision model 16 with respect to a body of visual data as input. Feedback from a human operator is not required to provide the global sensitivity analysis, and it does not characterize any cognitive aspect of human perception of an image. In other words, the global sensitivity analysis is a technical figure of merit for how well a computer vision model 16 responds to the variation of various visual parameters.

Results of the global sensitivity analysis 19 can be visualized 49 by an expert operator in a graphical user interface. Optionally, the expert operator may refine and improve 45 the set of visual parameters using the graphical user interface. For instance, a result of each global sensitivity analysis 19 can be a ranking of visual parameters 10 in terms of their relevance, and an expert operator may re-order the ranking of visual parameters, but this is not essential.

A first aspect relates to a computer-implemented method 100 for analysing the relevance of visual parameters for training a computer vision model 16. Relevance of visual parameters results from analysing the sensitivity of performance scores with respect to the visual parameters of the (first) visual parameter set. A quantitative measure for relevance can be variances of such performance scores.

The method comprises obtaining 110 a computer vision model 16 in an initial training state configured to perform a computer vision model of characterizing elements of observed scenes.

The method further comprises obtaining 120 a visual data set and selecting from it a first subset of items of visual data, and providing a first subset of groundtruth data that corresponds to the first subset of visual data.

Each item of (authentic or synthetic) visual data can be a numeric tensor. Optionally, the numeric tensor an extra dimension representing a video having a succession of video frames. An item of groundtruth data corresponding to one item of visual data is, for example a classification and/or regression result that the computer vision model should output in ideal conditions. For example, if the item of visual data is parameterized in part according to the presence of a wet road surface, and the presence, or not of a wet road surface is an intended output of the computer model to be trained, the groundtruth would return a description of that item of the associated item of visual data as comprising an image of a wet road.

Each item of groundtruth data can be another numeric tensor, or in a simpler case a binary result vector. A computer vision model is a function parametrized by model parameters that upon training can be learnt based on the training data set using machine learning techniques. The computer vision model is configured to at least map an item of visual data or a portion, or subset thereof to an item of predicted groundtruth data.

The method further comprises obtaining 130 a first visual parameter set, with at least one visual parameter therein defining at least one visual state of at least one item in the first subset of visual data, wherein the at least one visual state is capable of affecting a classification or regression result of the computer vision model. One or more visual parameters define a visual state because they contain information about the contents of an observed scene and/or represent boundary conditions for capturing and/or generating the observed scene. For example, the visual parameters may be decided under the influence of an expert, and/or composed using analysis software. The visual parameter set is also referred to as the operational design domain (ODD).

The method further comprises applying 140 the first subset of items of visual data to the computer vision model 16 to obtain a plurality of predictions of elements of observed scenes in the first subset of items of visual data, wherein the predictions comprise at least one classification result and/or at least one regression result of at least one item in the first subset of visual data.

The method further comprises computing 150 a corresponding plurality of performance scores of the first visual parameter set characterizing the accuracy of the first computer vision model 16 when providing the predictions of at least one classification result and/or at least one regression result, using the first subset of groundtruth data.

The method further comprises performing 160 a sensitivity analysis of the plurality of performance scores over the domain of the first visual parameter set.

As an example, a sensitivity measure can be a variance of performance scores with respect to visual parameters in the visual parameter set. Alternatively, the sensitivity measure may be evaluated on subsets, clusters, and/or combinations of visual parameters in the visual parameter set. As an illustration, a combination of two visual parameters could be given in terms of a direction in visual parameter space projecting both onto a dimension of inclination of sun and a dimension of wetness of the road. A sensitivity measure can result from a global sensitivity analysis 19.

The method further comprises generating 170 a second subset of items of visual data and a second subset of groundtruth data that corresponds to the second subset of visual data according to the sensitivity analysis of the plurality of performance scores over the domain of the first visual parameter set. For example, the second subset of items of visual data and a second subset of groundtruth data can be used as a training data set (cf. second aspect) and/or a validation data set.

The method is advantageously used to generate an improved training data set and/or an improved validation data set for training and/or testing a computer vision model. Improvement relates to training/validation data sets being adjusted to more relevant visual parameters of the visual parameter set, thus having less bias. More relevant visual parameters have higher variance on the performance of the computer vision model and result from a global sensitivity analysis. Training on the improved training data set (see second aspect) yields a computer vision model capable of better generalizing to unseen (out-of-sample) items of visual data, thus increasing the accuracy of predictions made by the computer vision model. Testing on the improved validation data set reduces time and costs for testing. The computer vision model being pre-trained is not contradictory to later on retraining the computer vision model based on validated synthetic visual data and corresponding groundtruth. Such retraining can be seen as refinement of the computer vision model and, if need be, may be iterated. The present technique can, thus, be applied at any stages of the iteration, to provide an assessment of model sensitivity prior to training, at any stage during training, and as a validation step after the training has finished.

Figure 2:
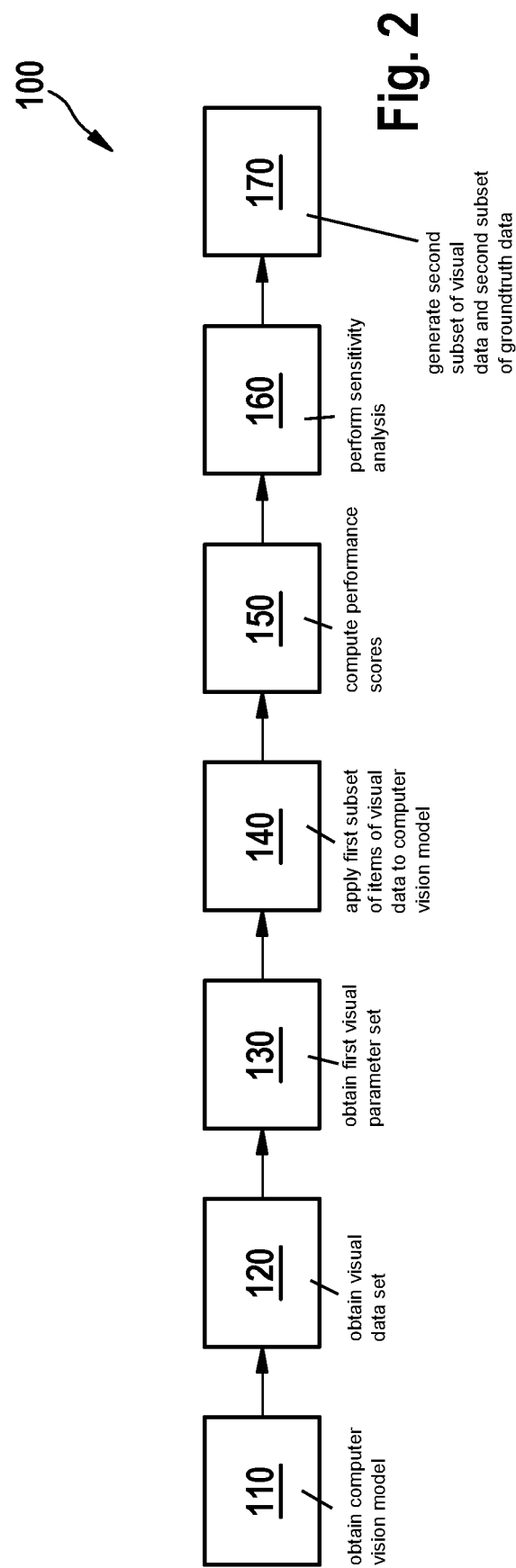
FIG. 2 schematically illustrates a computer-implemented method according to the first aspect for analysing the relevance of visual parameters for training a computer vision model, in accordance with an example embodiment of the present invention.

FIG. 2 schematically illustrates a computer-implemented method according to the first aspect for analysing the relevance of visual parameters for training a computer vision model.

As an example, the computer vision model 16 in an initial training state is provided in step 110. It is configured to perform a computer vision function of characterizing elements of observed scenes. In step 120, a visual data set is obtained and a first subset of items of visual data is selected from it. Also a first subset of groundtruth data that corresponds to the first subset of visual data is provided. In step 130, a first visual parameter set, with at least one visual parameter therein defining at least one visual state of at least one item in the first subset of visual data, is provided. The at least one visual state is capable of affecting a classification or regression result of the computer vision model 16.

The illustrated order of steps 110, 120, 130 is not essential. For each sample of visual parameters 10 from the first visual parameter set (or after a sampling step 11) a visual data set comprising visual data and groundtruth data is generated or sampled, i.e. captured or selected.

In step 140, the first subset of items of visual data is applied to the computer vision model 16 to obtain a plurality of predictions of elements of observed scenes in the first subset of items of visual data. The predictions comprise at least one classification result and/or at least one regression result of at least one item in the first subset of visual data.

In step 150, a corresponding plurality of performance scores of the first visual parameter set characterizing the accuracy of the first computer vision model 16 is computed, when providing the predictions of at least one classification result and/or at least one regression result, using the first subset of groundtruth data.

In step 160, a sensitivity analysis of the plurality of performance scores over the domain of the first visual parameter set is performed.

In step 170, a second subset of items of visual data and a second subset of groundtruth data is generated. The second subset of items of visual data and a second subset of groundtruth data corresponds to the second subset of visual data according to the sensitivity analysis of the plurality of performance scores over the domain of the first visual parameter set.

Figure 5:
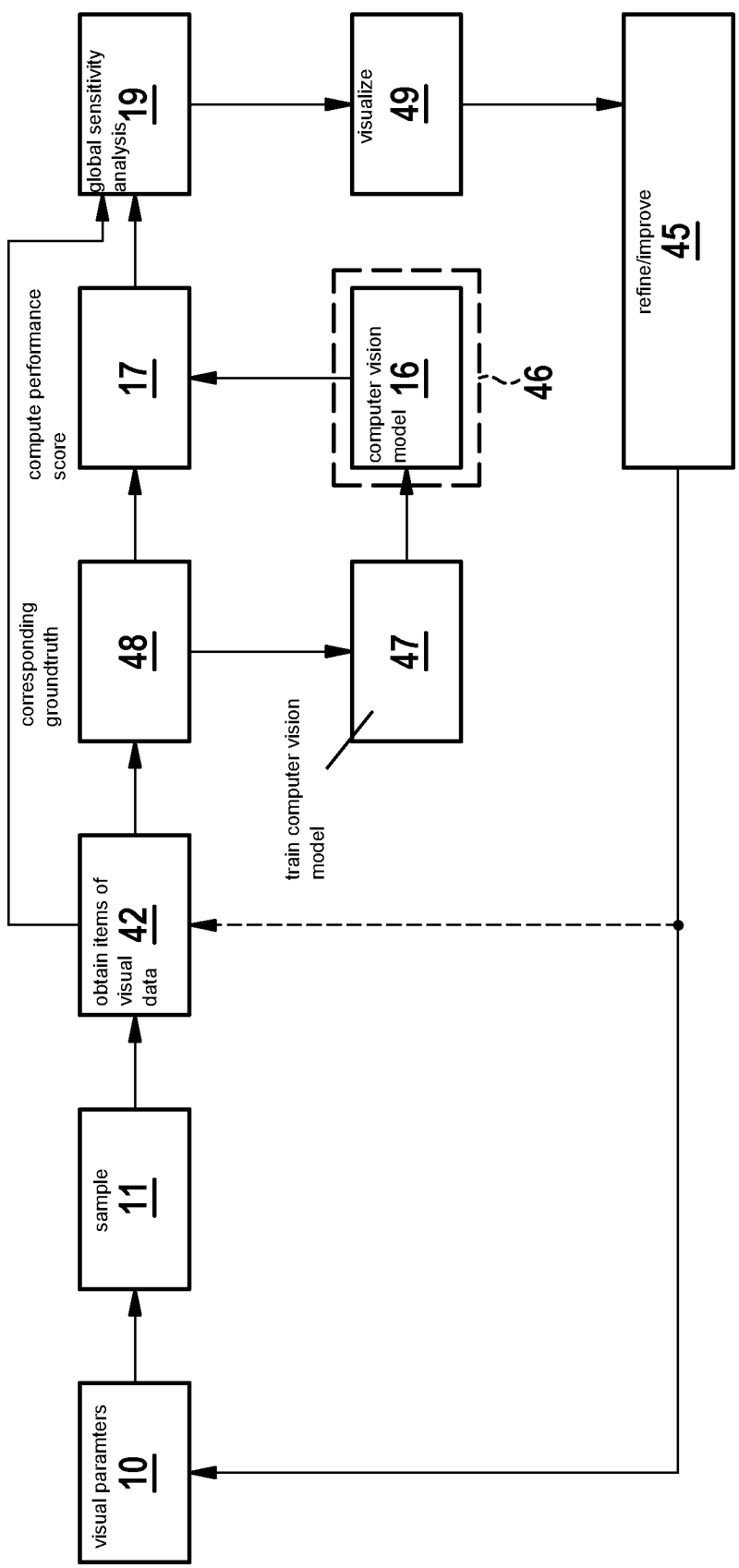
FIG. 5 schematically illustrates an example of a computer-implemented method for analysing the relevance of visual parameters for training a computer vision model, in accordance with an example embodiment of the present invention.

FIG. 5 schematically illustrates an example of a computer-implemented method for analysing the relevance of visual parameters for training a computer vision model.

An initial or first visual parameter set comprising, for example, set of initial visual parameters in terms of values or value ranges is defined 10 (for example, by an expert). Concrete instances of visual parameters are sampled 11. For each sample of a visual parameter an item of visual data and an item of corresponding groundtruth 48 is captured by a physical capturing device, generated by a synthetic image generator, and/or provided by a database according to the visual parameter.

Furthermore, a computer vision model 16 (optionally within an autonomous system 46) is trained based on items of visual data and corresponding groundtruth 48. Alternatively, in case of a pre-trained computer vision model 16, step 47 can be omitted. The computer vision model is used in a testing/validation step 17 to output items of predicted groundtruth for items of visual data obtained in 42. These items can also be different from those obtained for training the computer vision model, in which case steps 10, 11, and 42 can be repeated to generate new items that shall be used for testing rather than training the computer vision model 16. In step 17 performance scores are computed based on items of groundtruth and items of predicted groundtruths.

A sensitivity measure of performance scores with respect to visual parameters in the visual parameter set is determined using a global sensitivity analysis 19. Results of the global sensitivity analysis can be visualized 49 by an expert. As an example, step 19 may comprise generating a ranking of the plurality of visual parameters of the visual parameter set for the visual data based on the corresponding sensitivity measure. In other words, such a ranking may display 49 a sorting of variances of performance scores with respect to visual parameters or subsets, clusters, and/or combinations thereof. A global sensitivity analysis is one that assesses the variance (for example) of a computer vision model 16 to all visual parameters in the parameter space. However, this is not essential, and a sensitivity analysis may be defined over a subset of the parameter space.

An expert is enabled to refine or improve 45 visual parameters thus defining a second visual parameter set 10. If need be, this process can be iterated.

In an embodiment, the sensitivity analysis of the plurality of performance scores over the domain of the first visual parameter set comprises computing a plurality of variances of performance scores over the domain of the first visual parameter set.

In an embodiment, the method 100 according to the first aspect further comprises modifying the first visual parameter set by adding, removing, or redefining at least one visual parameter so as to increase an overall measure of variance of performance scores, thus yielding a second visual parameter set. Optionally, from the first visual parameter set, one or more visual parameters of the first visual data set having corresponding variances of performance scores that are below a corresponding significance threshold are removed.

As an example, redefining a visual parameter can be partitioning its value range into subintervals and promoting each such subinterval to a new dimension of visual parameters. In case of visual parameters residing in a vector space, a coordinate transformation would also be a redefinition of visual parameters. The overall measure of variance of performance scores results from an arithmetic operation (such as averaging, summing, weighting, etc.) on the measures of variance of performance scores corresponding to each visual parameter.

In an embodiment, generating 170 the second subset of items of visual data and the second subset of groundtruth data comprises sampling further items of visual data from the visual data set and corresponding groundtruth and/or synthesizing further items of visual data and corresponding groundtruth, each according to the second visual parameter set.

In an embodiment, the method 100 according to the first aspect further comprises generating a ranked list of visual parameters of the first visual parameter set according to the sensitivity analysis of the plurality of performance scores, thus yielding a first ordered visual parameter set. In other words, visual parameters can be ordered in terms of their variance of performance scores. The ranked list of visual parameters of the first visual parameter set is then provided according to the plurality of computed variances of respective performance scores of the plurality of performance scores with respect to a plurality of visual parameters.

In an embodiment, a domain of the first visual parameter set (or a domain of the second visual parameter set) comprises a subset, in a finite-dimensional vector space, of numerical representations that visual parameters are allowed to lie in, optionally a multi-dimensional interval of continuous or discrete visual parameters, or a set of numerical representations of visual parameters in the finite-dimensional vector space. Other spaces than vector spaces are possible as long as they allow for a global sensitivity analysis.

In an embodiment, the method 100 according to the first aspect further comprises displaying, via an output interface, the plurality of variances of performance scores of visual parameters in the first visual parameter set to a user, via a user interface. In other words, a visualization of the relevance of visual parameters is provided. This allows a better understanding of the computer vision model characteristics and thus testing of new designs of computer vision models. It is in displaying such information that a user or an expert is enabled to simulate the effects of modifications to the visual parameter set, for example, or modifications to the set of input data, to provide information concerning how to modify the first visual parameter set to arrive at the second visual parameter set with more relevant visual parameters.

In an embodiment, the method 100 according to the first aspect further comprises displaying the ranked list of visual parameters of the first visual parameter set. Such a displayed ranked list can easily be interpreted by an expert.

In an embodiment, the method 100 according to the first aspect further comprises receiving, via an input interface, a command to modify the first visual parameter set by removing at least one visual parameter in the first visual parameter set, and/or by changing the ranked list of at least one visual parameter in the first visual parameter set, to thus yield a user modified visual parameter set, i.e. the second visual parameter set.

In an embodiment, the second subset of items of visual data and the second subset of groundtruth data are assembled according to the user modified visual parameter set (i.e. according to the second visual parameter set). Items of visual data and items of groundtruth can be captured by an image capturing device, for example, a camera, selected from a database of captured or generated images with corresponding groundtruth, or generated by an image data generator.

In an embodiment, for each item in the training and/or validation data set, a performance score can be computed based on a comparison between the prediction of one or more elements within the observed scenes, and the corresponding item of groundtruth data. In particular, the plurality of performance scores comprises, or depends on, any one or any combination of a confusion matrix, precision, recall, F1 score, intersection of union, or mean average.

In an embodiment, the computer vision model is a neural or a neural-like network, optionally a deep neural network and/or a convolutional neural network. A neural-like network can be, for example, a composition of a given number of functions, wherein at least one function is a neural network, a deep neural network or a convolutional neural network.

In an embodiment, the performance scores are calculated using at least one classification label and/or at least one regression value obtained from the visual data and their corresponding groundtruth.

The computer vision model 16 may be configured to output at least one classification label and/or at least one regression value of at least one element comprised in a scene contained in at least one item of visual data. A classification label can for example refer to object detection, in particular to events like "obstacle/no obstacle in front of a vehicle".

A regression value can for example be a speed suggestion in response to road conditions, traffic signs, weather conditions etc.

As an example, a combination of at least one classification label and at least one regression value would be outputting both a speed limit detection and a speed suggestion. When applying the computer vision model 16 (feed-forward), such output relates to a predicted item of groundtruth data. During training such output of the computer vision model 16 relates to the groundtruth GT data in the sense that on a training data set predicted items of groundtruth data (from feed-forward) shall be as close as possible to items of (true) groundtruth data, at least statistically.

In an embodiment, value ranges for at least one of the plurality of visual parameters of the visual parameter set are partitioned into a plurality of subintervals based on the analysis of the sensitivity of the plurality of performance scores, wherein the plurality of subintervals are treated as new dimensions of the plurality of visual parameters. As an example, a value range for a visual parameter can be split into subintervals. Each such subinterval can be promoted to a new dimension with binary values indicating whether or not the visual parameter lies in the subinterval. Such can be advantageous, if it emerges, as a result of the sensitivity analysis, that performance behaviour is very different from one subinterval to another.

In an embodiment, the visual parameters may comprise one or any combination selected from the following list:
  one or more parameters describing a configuration of an image capture arrangement, optionally an image or video capturing device, visual data is taken in or synthetically generated for, optionally, spatial and/or temporal sampling, distortion aberration, colour depth, saturation, noise, absorption, reflectivity of surfaces;
  one or more light conditions in a scene of an image/video, light bounces, reflections, light sources, fog and light scattering, overall illumination; and/or
  one or more features of the scene of an image/video, optionally, one or more objects and/or their position, size, rotation, geometry, materials, textures;
  one or more parameters of an environment of the image/video capturing device or for a simulative capturing device of a synthetic image generator, optionally, environmental characteristics, seeing distance, precipitation characteristics, radiation intensity; and/or
  image characteristics, optionally, contrast, saturation, noise;
  one or more domain-specific descriptions of the scene of an image/video, optionally, one or more cars or road users, or one or more objects on a crossing.

According to a second aspect, there is provided a computer-implemented method for training a computer vision model.

The method according to the second aspect comprises obtaining the second subset of items of visual data and the second subset of groundtruth data according to the computer-implemented method of the first aspect, or its embodiments, as a training data set.

The method according to the second aspect comprises iteratively training a further computer vision model using the training data set. The further computer vision model can be the computer vision model used in the method of the first aspect or it can be another one, for example, one adjusted and/or redesigned in view of the results of the global sensitivity analysis of the method of the first aspect.

The method according to the second aspect further comprises outputting the further computer vision model. Outputting the further computer vision model can be seen as providing the further computer vision model in a machine-readable and/or machine-executable form so as to be used for computer vision model.

The method according to the second aspect is advantageously used to retrain a computer vision model on the improved training data set generated according to the method of the first aspect, or its embodiments. Such retraining can be seen as meta-learning or active learning because from a holistic point of view (i.e. as far as an outer loop comprising training, validation and retraining is concerned) the training data set is changed taking intermediate performance of the computer vision model into account.

A third aspect relates to an apparatus 300 for performing computer vision.

Figure 3:
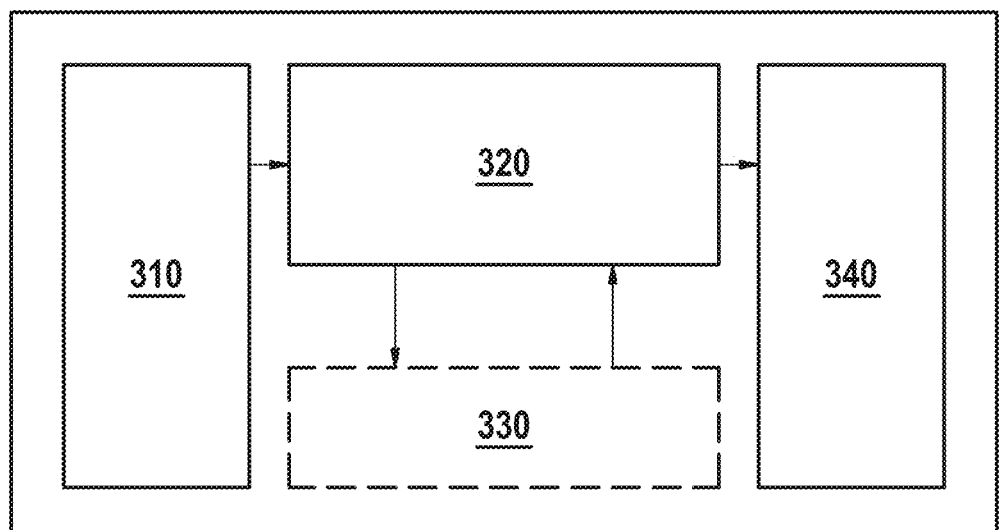
FIG. 3 schematically illustrates a data processing apparatus according to the third aspect, in accordance with an example embodiment of the present invention.

The apparatus 300 comprises an input interface 310, a processor 320, a memory 330, and an output interface 340. A data processing apparatus 300 is schematically illustrated in FIG. 3.

The input interface is configured to receive a further visual data set and a further computer vision model 16 trained according to the method of the second aspect, and store them in the memory.

The processor is configured to read the visual data set and the further computer vision model 16 from the memory, and to apply the visual data set to the further computer vision model 16, to thus generate at least one image classification and/or regression result.

The output interface is configured to output the at least one image classification or regression result.

A fourth aspect relates to a computer program 350 comprising machine-readable instructions which, when executed by a processor 360, is capable of carrying out either (i) the computer-implemented method for providing the second subset of items of visual data and the second subset of groundtruth data according to the method of the first aspect, or its embodiments, as a training data set, and/or (ii) the computer-implemented method for training a further computer vision model 16 according to the method of the second aspect.

The memory 330 of the apparatus 300 stores a computer program 350 according to the fourth aspect that, when executed by the processor 320, causes the processor 320 to execute the functionalities described by the computer-implemented methods according to the first and second aspects. According to an example, the input interface 310 and/or output interface 340 is one of a USB interface, an Ethernet interface, a WLAN interface, or other suitable hardware capable of enabling the input and output of data samples from the apparatus 300.

In an example, the apparatus 300 further comprises a volatile and/or non-volatile memory system 330 configured to receive input observations as input data from the input interface 310.

Figure 4:
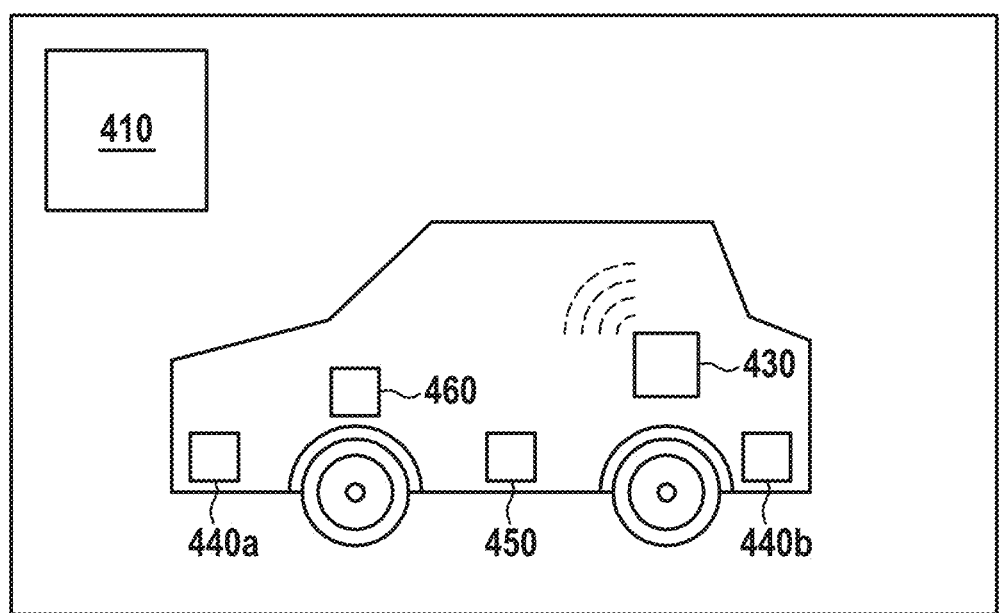
FIG. 4 schematically illustrates a distributed data communications system according to the sixth aspect, in accordance with an example embodiment of the present invention.

In an example, the apparatus 300 is an automotive embedded computer comprised in a vehicle as in FIG. 4, in which case the automotive embedded computer may be connected to sensors 440a, 440b and actuators 460 present in the vehicle. For example, the input interface 310 of the apparatus 300 may interface with one or more of an engine control unit ECU 450 providing velocity, fuel consumption data, battery data, location data and the like. For example, the output interface 340 of the apparatus 300 may interface with one or more of a plurality of brake actuators, throttle actuators, fuel mixture or fuel air mixture actuators, a turbocharger controller, a battery management system, the car lighting system or entertainment system, and the like.

A fifth aspect relates to a computer readable medium comprising one or both of the computer programs.

A sixth aspect relates to a distributed data communications system 400 comprising a data processing agent 410, a communications network and a terminal device 430, wherein the terminal device is optionally comprised within an automobile or robot.

The data processing agent 410, for example, a server, is configured to transmit the further computer vision model 16 trained according to the method in accordance with the present invention to the terminal device via the communications network.

In other words, a computer vision model is trained at a remote facility according to the first aspect, and is transmitted to the vehicle such as an autonomous vehicle, semi-autonomous vehicle, automobile or robot via a communications network as a software update to the vehicle, automobile or robot.

In general, sensitivity analysis (or, more narrower, global sensitivity analysis) can be seen as the numeric quantification of how the uncertainty in the output of a model or system can be divided and allocated to different sources of uncertainty in its inputs. This quantification can be referred to as sensitivity, or robustness. In the context of this specification, the model can, for instance, be taken to be the mapping, $$\Phi: X \to Y$$

from visual parameters (or visual parameter coordinates) $X_i$, i=1, ..., n based on which items of visual data have been captured/generated/selected to yield performance scores (or performance score coordinates) $Y_j$, j=1, ..., m based on the predictions and the groundtruth.

A variance-based sensitivity analysis, sometimes also referred to as the Sobol method or Sobol indices is a particular kind of (global) sensitivity analysis. To this end, samples of both input and output of the aforementioned mapping $\Phi$ can be interpreted in a probabilistic sense. In fact, as an example a (multi-variate) empirical distribution for input samples can be generated. Analogously, for output samples a (multi-variate) empirical distribution can be computed. A variance of the input and/or output (viz. of the performance scores) can thus be computed. Variance-based sensitivity analysis is capable of decomposing the variance of the output into fractions which can be attributed to input coordinates or sets of input coordinates. For example, in case of two visual parameters (i.e. n=2), one might find that 50% of the variance of the performance scores is caused by (the variance in) the first visual parameter ($X_1$), 20% by (the variance in) the second visual parameter ($X_2$), and 30% due to interactions between the first visual parameter and the second visual parameter. For n>2 interactions arise for more than two visual parameters. Note that if such interaction turns out to be significant, a combination between two or more visual parameters can be promoted to become a new visual dimension and/or a language entity. Variance-based sensitivity analysis is an example of a global sensitivity analysis.

Hence, when applied in the context of this specification, an important result of the variance-based sensitivity analysis is a variance of performance scores for each visual parameter. The larger a variance of performance scores for a given visual parameter, the more performance scores vary for this visual parameter. This indicates that the computer vision model is more unpredictable based on the setting of this visual parameter.

Figure 6A:
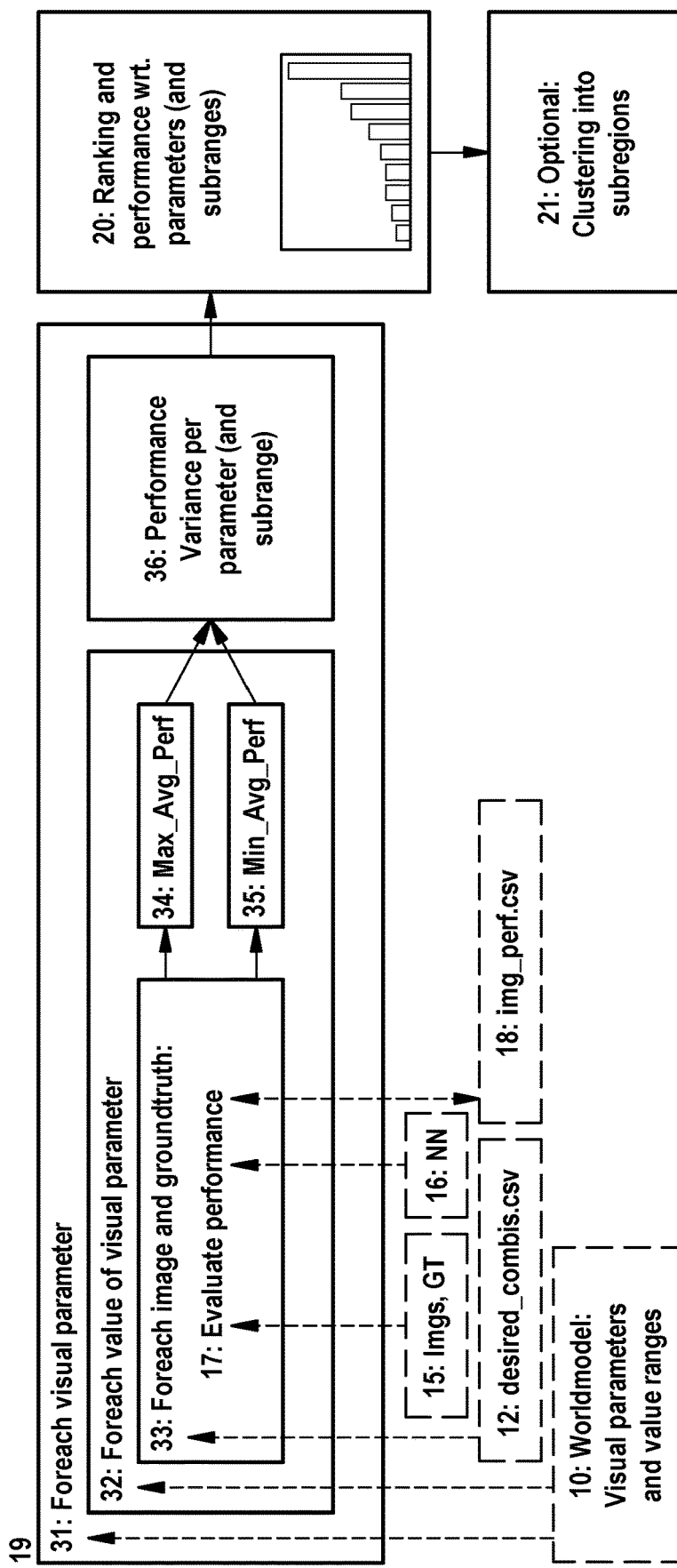
FIG. 6A schematically illustrates an example of a first implementation of a computer implemented calculation of a global sensitivity analysis of visual parameters, in accordance with an example embodiment of the present invention.

FIG. 6A schematically illustrates an example of a first implementation of a computer implemented calculation of a global sensitivity analysis of visual parameters.

Figure 6B:
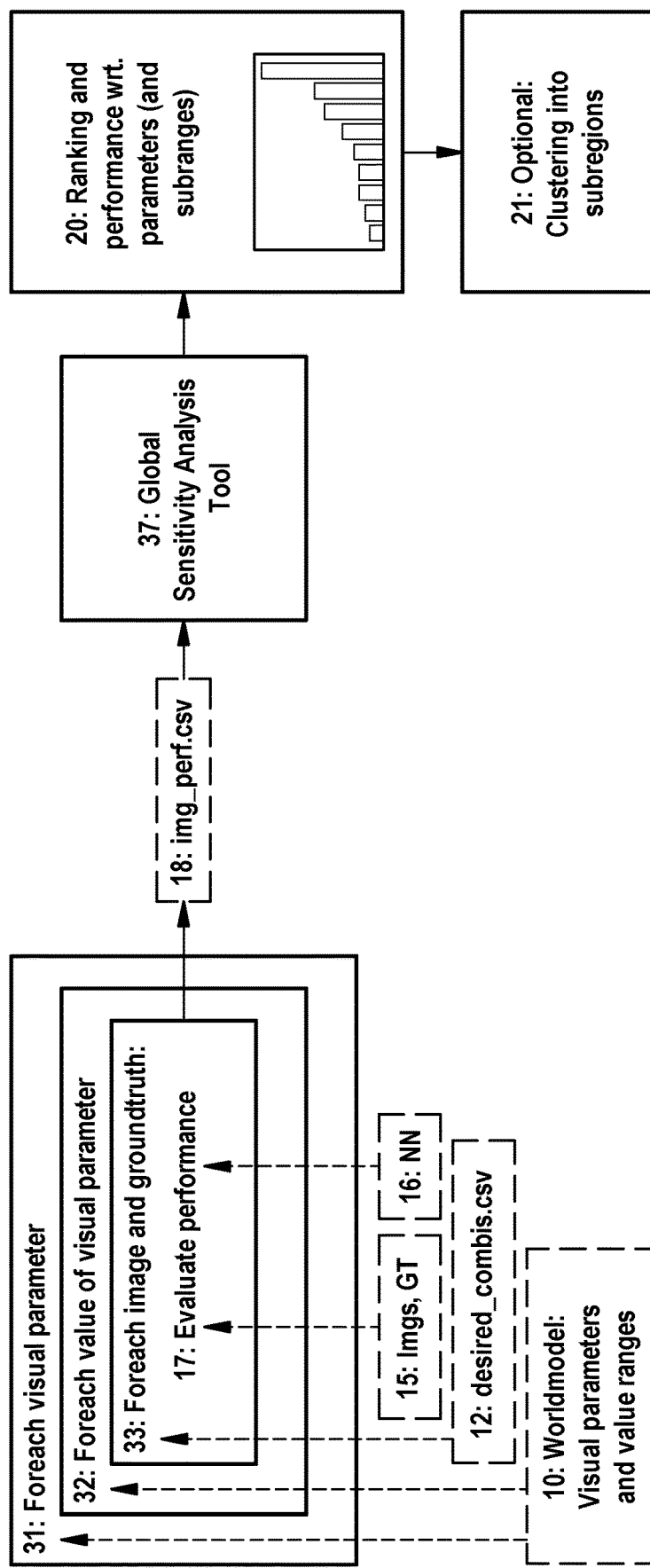
FIG. 6B schematically illustrates an example of a second implementation of a computer implemented calculation of a global sensitivity analysis of visual parameters, in accordance with an example embodiment of the present invention.

FIG. 6B schematically illustrates an example of a second implementation of a computer implemented calculation of a global sensitivity analysis of visual parameters.

As an example, a nested loop is performed for each visual parameter 31, for each value of the current visual parameter 32, for each item of visual data and corresponding item of groundtruth 33 is captured, generated, and selected for the current value of the current visual parameter an item of groundtruth is predicted by, for example, applying the second method (according to the second aspect).

In each such step, a performance score can be computed 17 based on the current item of groundtruth and the current item of predicted groundtruth. In so doing the mapping from visual parameters to performance scores can be defined, for example, in terms of a lookup-table. It is possible and often meaningful to classify, group or cluster visual parameters, for example in terms of subranges or combinations or conditions between various values/subranges of visual parameters.

In FIG. 6A, a measure of variance of performance scores (also referred to as performance variance) can be computed based on arithmetic operations such as, for example, a minimum, a maximum or an average of performance scores within one class, group or cluster.

Alternatively, in FIG. 6B a global sensitivity analysis can be performed by using a global sensitivity analysis tool 37. As an example, a ranking of performance scores and/or a ranking of variance of performance scores, both with respect to visual parameters or their class, groups or clusters can be generated and visualized. It is by this means that relevance of visual parameters can be determined, in particular irrespective of the biases of the human perception system. Also adjustment of the visual parameters, i.e. of the operational design domain (ODD), can result from quantitative criteria.

FIGS. 6A and 6B also include references to desired_combis.csv 12, Imgs, GT 15, img_perf.csv 18, Ranking and performance wrt. parameters (and subranges) 20, and Optional: Clustering into subregions 21. In addition, FIG. 6A also includes Max_Avg_Perf 34, Min_Avg_Perf 35, Performance Variance per parameter (and subrange) 36.

Figure 6C:
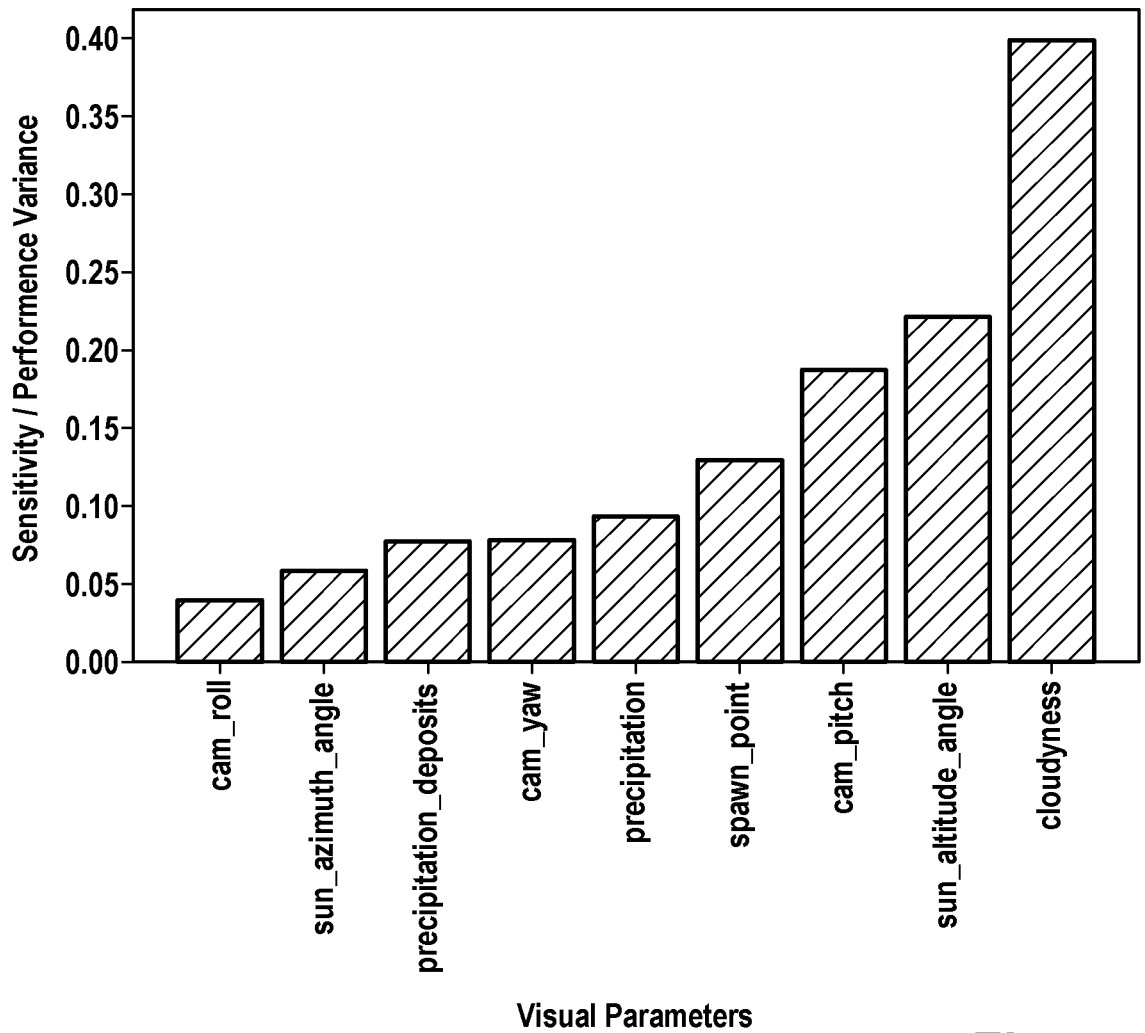
FIG. 6C schematically illustrates an example ranked list of visual parameters resulting from a global sensitivity analysis, in accordance with an example embodiment of the present invention.

FIG. 6C illustrates a ranked list of visual parameters with respective variances of performance scores resulting from the global sensitivity analysis.

FIG. 7A schematically illustrates an example pseudocode listing for defining a world model of visual parameters and for a sampling routine. The pseudocode, in this example, comprises parameter ranges for a spawn point, a cam yaw, a cam pitch, a cam roll, cloudiness, precipitation, precipitation deposits, sun inclination (altitude angle), sun azimuth angle. Moreover an example implementation for a sampling algorithm 11 based on all-pair testing is shown. The sampling algorithm 11 is used to sample the visual parameter set defined by the world model, with each sample of the visual parameters used to obtain an item of visual data and groundtruth complying with the visual parameter sample. The item of visual data and groundtruth can be obtained by generating synthetic image data compliant with the visual parameter sample, sampling an archive of real image data using the visual parameter sample, or specifying an experiment compliant with the visual parameter sample.

FIG. 7B shows an example pseudocode listing for evaluating a sensitivity of a visual parameter. In code lines (#)34, (#)35, (#)36 other arithmetic operations such as, for example, the computation of a standard deviation can be used.

The examples provided in the figures and described in the foregoing written description are intended for providing an understanding of the principles of this specification. No limitation to the scope of the present is intended thereby. The present specification describes alterations and modifications to the illustrated examples. Only preferred examples have been presented herein, and all changes, modifications and further applications to these within the scope of the specification are desired to be protected.

What is claimed is:

1. A computer-implemented method for analysing relevance of visual parameters for training a computer vision model, the method comprising the following steps:
    obtaining the computer vision model in an initial training state configured to perform a computer vision function of characterizing elements of observed scenes;
    obtaining a visual data set and selecting from the visual data set a first subset of items of visual data, and providing a first subset of groundtruth data that corresponds to the first subset of visual data;
    obtaining a first visual parameter set, with at least one visual parameter therein defining at least one visual state of at least one item in the first subset of visual data, wherein the at least one visual state is capable of affecting a regression result of the computer vision model;
    applying the first subset of items of visual data to the computer vision model to obtain a plurality of predictions of elements of observed scenes in the first subset of items of visual data, wherein the predictions include at least one regression result of the at least one item in the first subset of visual data;
    computing a corresponding plurality of performance scores of the first visual parameter set characterizing accuracy of the computer vision model when providing the predictions of the at least one regression result, using the first subset of groundtruth data;
    performing a sensitivity analysis of the plurality of performance scores over a domain of the first visual parameter set;
    generating a second subset of items of visual data and a second subset of groundtruth data that corresponds to the second subset of visual data according to the sensitivity analysis of the plurality of performance scores over the domain of the first visual parameter set.

2. The computer-implemented method according to claim 1, wherein the sensitivity analysis of the plurality of performance scores over the domain of the first visual parameter set includes computing a plurality of variances of performance scores over the domain of the first visual parameter set.

3. The computer-implemented method according to claim 2, wherein from the first visual parameter set, one or more visual parameters of the first visual data set having corresponding variances of performance scores that are below a corresponding significance threshold are removed.

4. The computer-implemented method according to claim 2, further comprising:
    displaying, via an output interface, the plurality of variances of performance scores over the domain of the first visual parameter set to a user, via a user interface.

5. The computer-implemented method according to claim 1, further comprising:
    modifying the first visual parameter set by adding, or removing, or redefining at least one visual parameter so as to increase an overall measure of variance of performance scores, thus yielding a second visual parameter set.

6. The computer-implemented method according to claim 1,
wherein the generating the second subset of items of visual data and the second subset of groundtruth data includes sampling further items of visual data from the visual data set and corresponding groundtruth and/or synthesizing further items of visual data and corresponding groundtruth, each according to the second visual parameter set.

7. The computer-implemented method according to claim 1, further comprising:
generating a ranked list of visual parameters of the first visual parameter set according to the sensitivity analysis of the plurality of performance scores, thus yielding a first ordered visual parameter set;
wherein the ranked list of visual parameters of the first visual parameter set is provided according to the plurality of computed variances of respective performance scores of the plurality of performance scores with respect to a plurality of visual parameters.

8. The computer-implemented method according to claim 7, further comprising:
displaying the ranked list of visual parameters of the first visual parameter set;
receiving, via an input interface, a command to modify the first visual parameter set by removing at least one visual parameter in the first visual parameter set, and/or by changing the ranked list of at least one visual parameter in the first visual parameter set, to thus yield a user modified visual parameter set.

9. The computer-implemented method according to claim 8, wherein the second subset of items of visual data and the second subset of groundtruth data are assembled according to the user modified visual parameter set.

10. The computer-implemented method according to claim 1, wherein the domain of the first visual parameter set includes a subset, in a finite-dimensional vector space, of numerical representations in which visual parameters are allowed.

11. The computer-implemented method according to claim 10, wherein the finite-dimensional space is a multi-dimensional interval of continuous or discrete visual parameters.

12. The computer-implemented method according to claim 1, wherein the domain includes a set of numerical representations of visual parameters in a finite-dimensional vector space.

13. The computer-implemented method according to claim 1, wherein the performance scores include, or are based on, any one or combination, of: a confusion matrix, or a precision score, or a recall score, or an F1 score, or a union intersection score, or a mean average score.

14. A computer-implemented method for training a computer vision model, comprising the following steps:
obtaining the computer vision model in an initial training state configured to perform a computer vision function of characterizing elements of observed scenes;
obtaining a visual data set and selecting from the visual data set a first subset of items of visual data, and providing a first subset of groundtruth data that corresponds to the first subset of visual data;
obtaining a first visual parameter set, with at least one visual parameter therein defining at least one visual state of at least one item in the first subset of visual data, wherein the at least one visual state is capable of affecting a regression result of the computer vision model;
applying the first subset of items of visual data to the computer vision model to obtain a plurality of predictions of elements of observed scenes in the first subset of items of visual data, wherein the predictions include at least one regression result of the at least one item in the first subset of visual data;
computing a corresponding plurality of performance scores of the first visual parameter set characterizing accuracy of the computer vision model when providing the predictions of the at least one regression result, using the first subset of groundtruth data;
performing a sensitivity analysis of the plurality of performance scores over a domain of the first visual parameter set;
generating, as a training data set, a second subset of items of visual data and a second subset of groundtruth data that corresponds to the second subset of visual data according to the sensitivity analysis of the plurality of performance scores over the domain of the first visual parameter set;
iteratively training a further computer vision model using the training data set;
outputting the further computer vision model.

15. An apparatus for performing computer vision, comprising:
an input interface;
a processor;
a memory; and
an output interface;
wherein the input interface is configured to receive a further visual data set and a further computer vision model trained by:
obtaining a computer vision model in an initial training state configured to perform a computer vision function of characterizing elements of observed scenes,
obtaining a visual data set and selecting from the visual data set a first subset of items of visual data, and providing a first subset of groundtruth data that corresponds to the first subset of visual data,
obtaining a first visual parameter set, with at least one visual parameter therein defining at least one visual state of at least one item in the first subset of visual data, wherein the at least one visual state is capable of affecting a regression result of the computer vision model,
applying the first subset of items of visual data to the computer vision model to obtain a plurality of predictions of elements of observed scenes in the first subset of items of visual data, wherein the predictions include at least one regression result of the at least one item in the first subset of visual data,
computing a corresponding plurality of performance scores of the first visual parameter set characterizing accuracy of the computer vision model when providing the predictions of at least one regression result, using the first subset of groundtruth data,
performing a sensitivity analysis of the plurality of performance scores over a domain of the first visual parameter set,
generating, as a training data set, a second subset of items of visual data and a second subset of groundtruth data that corresponds to the second subset of visual data according to the sensitivity analysis of the plurality of performance scores over the domain of the first visual parameter set,
iteratively training the further computer vision model using the training data set, outputting the further computer vision model;
  wherein the processor is configured to read the further visual data set and the further computer vision model from the memory, and to apply the further visual data set to the further computer vision model, to thus generate the at least one regression result; and
  wherein the output interface is configured to output the at least one regression result.

16. A non-transitory computer readable medium on which is stored a computer program including machine-readable instructions for training a computer vision model, the machine readable instructions, when executed by a processor, causing the processor to perform the following steps:
  obtaining the computer vision model in an initial training state configured to perform a computer vision function of characterizing elements of observed scenes;
  obtaining a visual data set and selecting from the visual data set a first subset of items of visual data, and providing a first subset of groundtruth data that corresponds to the first subset of visual data;
  obtaining a first visual parameter set, with at least one visual parameter therein defining at least one visual state of at least one item in the first subset of visual data, wherein the at least one visual state is capable of affecting a regression result of the computer vision model;
  applying the first subset of items of visual data to the computer vision model to obtain a plurality of predictions of elements of observed scenes in the first subset of items of visual data, wherein the predictions include at least one regression result of the at least one item in the first subset of visual data;
  computing a corresponding plurality of performance scores of the first visual parameter set characterizing accuracy of the computer vision model when providing the predictions of the at least one regression result, using the first subset of groundtruth data;
  performing a sensitivity analysis of the plurality of performance scores over a domain of the first visual parameter set;
  generating, as a training data set, a second subset of items of visual data and a second subset of groundtruth data that corresponds to the second subset of visual data according to the sensitivity analysis of the plurality of performance scores over the domain of the first visual parameter set;
  iteratively training a further computer vision model using the training data set;
  outputting the further computer vision model.

17. A distributed data communications system, comprising:
  a data processing agent;
  a communications network; and
  a terminal device;
  wherein the data processing agent is configured to transmit a further computer vision model to the terminal device via the communications network, the further computer vision model being trained by:
    obtaining a computer vision model in an initial training state configured to perform a computer vision function of characterizing elements of observed scenes,
    obtaining a visual data set and selecting from the visual data set a first subset of items of visual data, and providing a first subset of groundtruth data that corresponds to the first subset of visual data,
    obtaining a first visual parameter set, with at least one visual parameter therein defining at least one visual state of at least one item in the first subset of visual data, wherein the at least one visual state is capable of affecting a regression result of the computer vision model,
    applying the first subset of items of visual data to the computer vision model to obtain a plurality of predictions of elements of observed scenes in the first subset of items of visual data, wherein the predictions include at least one regression result of the at least one item in the first subset of visual data,
    computing a corresponding plurality of performance scores of the first visual parameter set characterizing accuracy of the computer vision model when providing the predictions of the-at least one regression result, using the first subset of groundtruth data,
    performing a sensitivity analysis of the plurality of performance scores over a domain of the first visual parameter set,
    generating, as a training data set, a second subset of items of visual data and a second subset of groundtruth data that corresponds to the second subset of visual data according to the sensitivity analysis of the plurality of performance scores over the domain of the first visual parameter set, and
    iteratively training the further computer vision model using the training data set.

18. The distributed data communications system according to claim 17, wherein the terminal is within an automobile or a robot.

* * * * *